(12) United States Patent
Tarachandani et al.

(10) Patent No.: US 8,510,292 B2
(45) Date of Patent: Aug. 13, 2013

(54) ISOLATION FOR APPLICATIONS WORKING ON SHARED XML DATA

(75) Inventors: Asha Tarachandani, Newark, CA (US); Sivasankaran Chandrasekar, Palo Alto, CA (US); Man-Hay Tam, Belmont, CA (US); Anh-Tuan Tran, Vacaville, CA (US); Ravi Murthy, Fremont, CA (US); Nipun Agarwal, Santa Clara, CA (US); Eric Sedlar, San Francisco, CA (US)

(73) Assignee: Oracle International Coporation, Redwood Shores, CA (US)

( * ) Notice: Subject to any disclaimer, the term of this patent is extended or adjusted under 35 U.S.C. 154(b) by 1711 days.

(21) Appl. No.: 11/442,106

(22) Filed: May 25, 2006

(65) Prior Publication Data

US 2007/0276792 A1 Nov. 29, 2007

(51) Int. Cl.
*G06F 7/00* (2006.01)
*G06F 17/30* (2006.01)

(52) U.S. Cl.
USPC ........................................................ 707/718

(58) Field of Classification Search
USPC ............................................................. 707/3
See application file for complete search history.

(56) References Cited

U.S. PATENT DOCUMENTS

| 5,210,686 A | 5/1993 | Jernigan |
| 5,295,261 A | 3/1994 | Simonetti |
| 5,369,763 A | 11/1994 | Biles |
| 5,404,513 A | 4/1995 | Powers et al. |
| 5,410,691 A | 4/1995 | Taylor |
| 5,454,101 A | 9/1995 | Mackay et al. |
| 5,467,471 A | 11/1995 | Bader |
| 5,524,240 A | 6/1996 | Barbara et al. |
| 5,530,849 A | 6/1996 | Hanushevsky et al. |
| 5,544,360 A | 8/1996 | Lewak et al. |
| 5,546,571 A | 8/1996 | Shan et al. |
| 5,568,640 A | 10/1996 | Nishiyama et al. |

(Continued)

FOREIGN PATENT DOCUMENTS

| EP | 1 241 589 A2 | 9/2002 |
| WO | WO 00/49533 A2 | 8/2000 |
| WO | WO 01/42881 A2 | 6/2001 |
| WO | WO 01/59602 A1 | 8/2001 |
| WO | WO 01/61566 A1 | 8/2001 |
| WO | WO 03/027908 A2 | 4/2003 |

OTHER PUBLICATIONS

Bourret, R. et al., "A Generic Load/Extract Utility for Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

(Continued)

*Primary Examiner* — Alexey Shmatov
(74) *Attorney, Agent, or Firm* — Hickman Palermo Truong Becker Bingham Wong LLP

(57) ABSTRACT

A mechanism is provided for detecting and disregarding application specific nodes contained in shared XML documents. The techniques described involve determining one or more application specific nodes within XML documents and performing path expression evaluations of the XML documents as if the nodes are not present. In one embodiment, a mechanism is provided by which a user may specify the criterion that determines which subset of nodes in XML documents are to be ignored from path expression evaluations. A query that specifies a path operation based on a path is evaluated ignoring said identified nodes when evaluating said path operation.

20 Claims, 3 Drawing Sheets

(56) References Cited

U.S. PATENT DOCUMENTS

| | | |
|---|---|---|
| 5,643,633 A | 7/1997 | Telford et al. |
| 5,680,614 A | 10/1997 | Bakuya et al. |
| 5,701,467 A | 12/1997 | Freeston |
| 5,724,577 A | 3/1998 | Exley et al. |
| 5,734,887 A | 3/1998 | Kingberg et al. |
| 5,838,965 A | 11/1998 | Kavanagh et al. |
| 5,842,212 A | 11/1998 | Balluvio |
| 5,870,590 A | 2/1999 | Kita et al. |
| 5,878,415 A | 3/1999 | Olds |
| 5,917,492 A | 6/1999 | Bereiter et al. |
| 5,921,582 A | 7/1999 | Gusack |
| 5,964,407 A | 10/1999 | Sandkleiva |
| 5,974,407 A | 10/1999 | Sacks |
| 5,987,506 A | 11/1999 | Carter et al. |
| 6,003,040 A | 12/1999 | Mital et al. |
| 6,038,563 A | 3/2000 | Bapat et al. |
| 6,055,544 A | 4/2000 | DeRose et al. |
| 6,061,684 A | 5/2000 | Glasser et al. |
| 6,101,500 A | 8/2000 | Lau |
| 6,111,578 A | 8/2000 | Tesler |
| 6,112,209 A | 8/2000 | Gusack |
| 6,128,610 A | 10/2000 | Srinivasan et al. |
| 6,141,655 A | 10/2000 | Johnson et al. |
| 6,154,741 A | 11/2000 | Feldman |
| 6,182,121 B1 | 1/2001 | Wlaschin |
| 6,189,012 B1 | 2/2001 | Mital et al. |
| 6,192,273 B1 | 2/2001 | Igel et al. |
| 6,192,373 B1 | 2/2001 | Haegele |
| 6,199,195 B1 | 3/2001 | Goodwin et al. |
| 6,208,993 B1 | 3/2001 | Shadmon |
| 6,236,988 B1 | 5/2001 | Aldred |
| 6,263,332 B1 | 7/2001 | Nasr et al. |
| 6,269,380 B1 | 7/2001 | Terry et al. |
| 6,279,006 B1 | 8/2001 | Shigemi et al. |
| 6,279,007 B1 | 8/2001 | Uppala |
| 6,298,349 B1 | 10/2001 | Toyoshima et al. |
| 6,330,573 B1 | 12/2001 | Salisbury et al. |
| 6,343,287 B1 | 1/2002 | Kumar et al. |
| 6,356,920 B1 | 3/2002 | Vandersluis |
| 6,366,934 B1 | 4/2002 | Cheng et al. |
| 6,370,537 B1 | 4/2002 | Gilbert et al. |
| 6,427,123 B1 | 7/2002 | Sedlar |
| 6,470,344 B1 | 10/2002 | Kothuri et al. |
| 6,487,546 B1 | 11/2002 | Witkowski |
| 6,496,842 B1 | 12/2002 | Lyness |
| 6,519,597 B1 | 2/2003 | Cheng et al. |
| 6,539,398 B1 | 3/2003 | Hannan et al. |
| 6,549,916 B1 | 4/2003 | Sedlar |
| 6,571,231 B2 | 5/2003 | Sedlar |
| 6,604,100 B1 | 8/2003 | Fernandez et al. |
| 6,609,121 B1 | 8/2003 | Ambrosini et al. |
| 6,636,845 B2 | 10/2003 | Chau et al. |
| 6,643,633 B2 | 11/2003 | Chau et al. |
| 6,662,342 B1 | 12/2003 | Marcy |
| 6,684,227 B2 | 1/2004 | Duxbury |
| 6,697,805 B1 | 2/2004 | Choquier et al. |
| 6,704,739 B2 | 3/2004 | Craft et al. |
| 6,704,747 B1 | 3/2004 | Fong |
| 6,708,186 B1 | 3/2004 | Claborn et al. |
| 6,718,322 B1 | 4/2004 | Brye |
| 6,725,212 B2 | 4/2004 | Couch et al. |
| 6,754,661 B1 | 6/2004 | Hallin et al. |
| 6,772,350 B1 | 8/2004 | Belani et al. |
| 6,785,673 B1 | 8/2004 | Fernandez et al. |
| 6,801,224 B1 | 10/2004 | Lewallen |
| 6,826,553 B1 * | 11/2004 | DaCosta et al. ............ 707/1 |
| 6,826,727 B1 | 11/2004 | Mohr et al. |
| 6,836,778 B2 | 12/2004 | Manikutty et al. |
| 6,836,857 B2 | 12/2004 | Ten-Hove et al. |
| 6,920,457 B2 | 7/2005 | Pressmar |
| 6,964,025 B2 | 11/2005 | Angiulo et al. |
| 6,996,571 B2 | 2/2006 | McConnell |
| 7,031,956 B1 | 4/2006 | Lee et al. |
| 7,043,488 B1 | 5/2006 | Bauer et al. |
| 7,096,224 B2 | 8/2006 | Murthy et al. |
| 7,139,746 B2 | 11/2006 | Shin et al. |
| 7,162,485 B2 | 1/2007 | Gottlob et al. |
| 7,171,404 B2 | 1/2007 | Lindblad et al. |
| 7,171,407 B2 | 1/2007 | Barton et al. |
| 7,216,127 B2 | 5/2007 | Auerbach |
| 7,287,023 B2 | 10/2007 | Fan et al. |
| 7,315,852 B2 | 1/2008 | Balmin et al. |
| 7,366,735 B2 * | 4/2008 | Chandrasekar et al. ... 707/104.1 |
| 7,370,061 B2 | 5/2008 | Chakraborty et al. |
| 7,499,915 B2 | 3/2009 | Chandrasekar et al. |
| 7,685,145 B2 | 3/2010 | Bruno et al. |
| 2001/0049675 A1 | 12/2001 | Mandler et al. |
| 2002/0056025 A1 | 5/2002 | Qiu et al. |
| 2002/0078068 A1 * | 6/2002 | Krishnaprasad et al. .. 707/104.1 |
| 2002/0116371 A1 | 8/2002 | Dodds et al. |
| 2002/0133484 A1 | 9/2002 | Chau et al. |
| 2002/0143512 A1 | 10/2002 | Shamoto et al. |
| 2002/0152267 A1 | 10/2002 | Lennon |
| 2002/0156811 A1 | 10/2002 | Krupa |
| 2002/0184188 A1 | 12/2002 | Mandyam et al. |
| 2002/0184401 A1 | 12/2002 | Kadel, Jr. et al. |
| 2002/0188613 A1 | 12/2002 | Chakraborty et al. |
| 2003/0004937 A1 | 1/2003 | Salmenkaita et al. |
| 2003/0009361 A1 | 1/2003 | Hancock et al. |
| 2003/0065659 A1 | 4/2003 | Agarwal et al. |
| 2003/0078906 A1 | 4/2003 | Ten-Hove et al. |
| 2003/0093672 A1 | 5/2003 | Cichowlas |
| 2003/0101194 A1 | 5/2003 | Rys et al. |
| 2003/0131051 A1 | 7/2003 | Lection et al. |
| 2003/0140311 A1 * | 7/2003 | Lemon et al. ............... 715/513 |
| 2003/0172135 A1 | 9/2003 | Bobick et al. |
| 2003/0177341 A1 | 9/2003 | Devillers |
| 2003/0182624 A1 | 9/2003 | Large |
| 2003/0212662 A1 | 11/2003 | Shin et al. |
| 2003/0212664 A1 | 11/2003 | Breining et al. |
| 2004/0010752 A1 | 1/2004 | Chan et al. |
| 2004/0043758 A1 | 3/2004 | Sorvari et al. |
| 2004/0044659 A1 | 3/2004 | Judd et al. |
| 2004/0064466 A1 | 4/2004 | Manikutty et al. |
| 2004/0068494 A1 | 4/2004 | Tozawa et al. |
| 2004/0088320 A1 | 5/2004 | Perry |
| 2004/0103105 A1 | 5/2004 | Lindblad et al. |
| 2004/0148278 A1 | 7/2004 | Milo et al. |
| 2004/0149278 A1 | 8/2004 | Lin |
| 2004/0167864 A1 | 8/2004 | Wang et al. |
| 2004/0176958 A1 | 9/2004 | Salmenkaita et al. |
| 2004/0205551 A1 | 10/2004 | Santos |
| 2004/0220912 A1 | 11/2004 | Manikutty et al. |
| 2004/0225680 A1 | 11/2004 | Cameron et al. |
| 2004/0230667 A1 | 11/2004 | Wookey |
| 2004/0267760 A1 | 12/2004 | Brundage et al. |
| 2005/0038688 A1 | 2/2005 | Collins et al. |
| 2005/0050016 A1 | 3/2005 | Stanoi et al. |
| 2005/0050058 A1 | 3/2005 | Jain et al. |
| 2005/0050092 A1 | 3/2005 | Jain et al. |
| 2005/0091188 A1 * | 4/2005 | Pal et al. ..................... 707/1 |
| 2005/0097084 A1 | 5/2005 | Balmin et al. |
| 2005/0108630 A1 | 5/2005 | Wasson et al. |
| 2005/0120031 A1 | 6/2005 | Ishii |
| 2005/0187897 A1 | 8/2005 | Pawar et al. |
| 2005/0228792 A1 * | 10/2005 | Chandrasekaran et al. ...... 707/9 |
| 2005/0228818 A1 | 10/2005 | Murthy et al. |
| 2005/0229158 A1 | 10/2005 | Thusoo et al. |
| 2005/0257201 A1 | 11/2005 | Rose et al. |
| 2005/0289125 A1 | 12/2005 | Liu et al. |
| 2006/0080345 A1 | 4/2006 | Murthy et al. |
| 2006/0129584 A1 | 6/2006 | Hoang et al. |
| 2007/0239681 A1 | 10/2007 | Krishnaprasad et al. |
| 2007/0250527 A1 * | 10/2007 | Murthy et al. ............... 707/102 |

OTHER PUBLICATIONS

Braga, Daniele et al., "A Graphical Environment to Query XML Data with Query," Proc. Fourth International Conference on Web Information Systems Engineering (WISE '03), 2003, IEEE, 10 pages.

Chae, Mi-Ok et al., "Design and Implementation of an Object-Oriented Multimedia DBMS Tightly Couple with Information Retrieval Functions," Proc. Seventeenth IASTED International Conference on Applied Informatics, Feb. 15-18, 1999, abstract.

Chakraborty, Krishnendu, "The XML Garbage Collector," The Source for Developers, Sun Developer Network Site XP-002297849, Mar. 2002.

Chen, Ruey-Shun et al., "Developing an XML framework for metadata system," Trinity College Dublin, Proc. of First International Symposium on Information and Communication, pp. 267-272.

Cheng, Josephine et al., "IBM DB2 XML Extender," IEEE, ICDE '00 Conference, San Diego, Feb. 2000, 128 pages.

Cooper, Brian F. et al., "A Fast Index for Semistructured Data," Proc. of the International Conference on Very Large Databases, 2001, XP-002303292, pp. 341-350.

Diao, Y. et al., "Path Sharing and Predicate Evaluation for High Performance XML Filtering," XP-002344354 ACM Transactions on Database Systems (2003), pp. 467-516.

Diao, Y. et al., "YFilter: Efficient and Scalable Filtering of XML Documents," IEEE (2002), 2 pages.

Draper, Denise, "Mapping Between XML and Relational Data" [online], Feb. 6, 2004 [retrieved on Aug. 17, 2004]. Retrieved from the Internet: http://www.awprofessional.com/articles/printerfriendly.asp?p-169590.

Helmer, S. et al., "Optimized Translations of XPath into Algebraic Expressions Parameterized by Programs Containing Navigational Primitives" IEEE (2002) 10 pages.

Jonah, Kevin, Databases Tag Along with XML [online], Jul. 1, 2002, [retrieved on Aug. 17, 2004]. Retrieved from the Internet: http://www.gcn.com/21_17/guide/19148-1.html 3 pages.

Kudrass, Thomas, "Management of XML Documents Without Schema in Relational Database Systems," Information and Software Technology, vol. 44, No. 4, Mar. 31, 2002, XP-004347776, pp. 269-275.

Lehman, Mike, "From XML to Storage and Back" [online], [retrieved on Aug. 17, 2004]. Retrieved from the Internet: http://www.oracle.com/technology/oramag/oracle/03-mar/o23xml.html 8 pages.

Lo et al., "XAS: A System for Accessing Componentized, Virtual XML Documents," IEEE, 2001, pp. 493-502.

McHugh, Jason et al., "Query Optimization for XML," XP-002333353, Proc. of the 25$^{th}$ VLDB Conference (1999) pp. 315-326.

McHugh, Jason et al., "Indexing Semistructured Data," Stanford Science Department, 1998, XP-002248313, pp. 1-21.

MacKenzie, David et al., "Finding Files," GNU Findutils Version 4.1.2, Nov. 1994, 38 pages.

Manolescu, Dragos, Review of "Metadata solutions: using metamodels, repositories, XML, and enterprise portals to generate information on demand by Adrienne Tannenbaum," Mar. 2003, ACM Press, vol. 28, Issue 2, p. 38.

Michell, Nancy, "Data Shredding, Updating the Status Bar, and More," [online], Feb. 2003, [retrieved on Aug. 17, 2004]. Retrieved from the Internet: http://msdn.microsoft.com/msdnmag/issues/03/03/WebQA/ 6 pages.

Myllymaki, Jussi, "Effective Web Data Extraction with Standard XML Technologies," WWW10, May 1-5, 2001, pp. 689-696.

Noser, Hansrudi et al., "Dynamic 3D Visualization of Database-Defined Tree Structures on the WWW by Using Rewriting Systems," 2000, IEEE, XP-002262516, pp. 247-254.

Peng, Feng et al., "XPath queries on streaming data" (2003) ACM Press, pp. 431-442.

Schmidt, et al., "Why and How to Benchmark XML Databases," SIGMOND Record, vol. 3, No. 3, Sep. 2001, pp. 27-32.

Vion-Dury, Jean-Yves, "XPath on left and right sides of rules: toward compact XML tree rewriting through node patterns," (2003) ACM Press, pp. 19-25.

Vorthman, S. et al., "Beyond Schemas, Schema Adjuncts and the Outside World," Markup Languages, Online!, vol. 2, No. 3, Jun. 2000, pp. 1-8.

W3C, "XML Fragment Interchange," W3C Working Draft, Jun. 30, 1999, XP-002167090, 17 pages.

W3C, "XML Fragment Interchange," W3C Candidate Recommendation, Feb. 12, 2001, pp. 1-16.

W3C, XML Path Language (XPath) Version 1.0, W3C Recommendation Nov. 16, 1999 [online] Copyright 1999 [retrieved on Aug. 16, 2004]. Retrieved from the Internet: http://www.w3.org/TR/xpath.

Yoshikawa, Masatoshi et al., "XRel: A Path-Based Approach to Storage and Retrieval of XML Documents Using Relational Databases," XP-001143686, ACM Transactions on Internet Technology (2001), pp. 110-141.

Zhang, Wansong, et al., "An Encoding Scheme for Indexing XML Data," E-Commerce and E-Service, 2004, XP-010697639, pp. 526-529.

Zisman et al., "Using XML to Build Consistency Rules for Distributed Specifications," Proc. of the Tenth International Workshop on Software Specification and Design (IWSD'00), IEEE 2000, 8 pages.

"Communication Pursuant to Article 96(2) EPC," EP App. No. 02799692.5, dated Jan. 18, 2006, 5 pages.

"Notification of Transmittal of the International Search Report and the Written Opinion of the International Searching Authority," Application No. PCT/US2005/020802.

"Notification of Transmittal of the International Search Report and Written Opinion of the International Searching Authority, or the Declaration," Application No. PCT/US2005/011763, dated Aug. 1, 2005, 12 pages.

"Notification of Transmittal of the International Search Report and Written Opinion of the International Searching Authority, or the Declaration," Application No. PCT/US2005/011762.

"Notification of Transmittal of the International Search Report and Written Opinion of the International Searching Authority, or the Declaration," Application No. PCT/US2005/020795, dated Sep. 27, 2005, 13 pages.

"Written Opinion of the International Preliminary Examining Authority," International Preliminary Examining Authority, Application No. PCT/US2005/020795, dated May 31, 2006, 5 pages.

"Notification of Transmittal of the International Preliminary Report of Patentability," International Preliminary Examining Authority, Application No. PCT/US2005/020795, dated Aug. 7, 2006, 10 pages.

Girardot et al., "Millau: an encoding format for efficient representation and exchange of XML over the Web", IBM Almaden Research Center, 24 pages.

Shankar Pal et al., "Indexing XML Data Stored in a Relational Database", Proceedings of the 30$^{th}$ VLDB Conference, 2004, 12 pages.

MacKenzie et al., "Finding Files", FindUtils, Version 4.1.2, Source Code, GNU.org, Nov. 1997, source files, code. C, 22 pages.

Cormen et al., "Introduction to Algorithms", MIT Press, 2001, 2$^{nd}$ Edition, 4 pages.

European Patent Office, "Communication pursuant to Article 94 (3) EPC", European patent application 05732473.3-1225, dated Feb. 4, 2008, 7 pages.

State Intellectual Property Office of P.R.C., "Notification of the First Office Action", European patent application 2005800186273.9, dated Oct. 12, 2007, 9 pages.

Claims, European patent application 2005800186273.9, 3 pages.

Claims, European patent application 05732473.3-1225, 3 pages.

M. Stonebraker, "The Case for Partial Indexes", 1989, 8 pages.

Daniel C. Zilio et al., "DB2 Advisory: An Optimizer Smart Enough to Recommend Its Own Indexes", 2000 IEEE, pp. 101-110.

* cited by examiner

ISOLATION FOR APPLICATIONS WORKING ON SHARED XML DATA

RELATED APPLICATION

This application is related to U.S. patent application Ser. No. 11/401,613, filed on Apr. 10, 2006 entitled A Mechanism for Improving Performance on XML Over XML Data Using Path Subsetting, filed by Asha Tarachandani, the contents of which are herein incorporated by reference in their entirety for all purposes.

FIELD OF THE INVENTION

The present invention relates to processing XML data, and in particular, processing XML related operations on shared XML data.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The Extensible Markup Language (XML) is a widely accepted standard for data and documents in the computer industry. XML describes and provides structure to a body of data, such as a file or data packet. The XML standard provides for tags that delimit sections of a XML entity referred to as XML elements. The following XML document A illustrates the components of an XML document.

| XML document A |
|---|
| <a c="foo"> |
| <b>3</b> |
| <d>10</d> |
| </a> |

XML elements are delimited by a start tag and a corresponding end tag. For example, segment A contains the start tag <b> and the end tag </b> to delimit an element. The data between the elements is referred to as the element's content. The name of the element delimited by <b> and the end tag </b> is b and is thus referred to herein as element b or just b.

An element's content may include the elements value, one or more attributes, and one or more elements. Element a contains two elements b and d. An element that is contained by another element is referred to as a descendant of that element. Thus, elements b and d are descendants of element a. An element's attributes are also referred to as being contained by the element.

Database servers that store XML documents perform various XML related operations on the XML documents using XML query languages, such as XQuery/XPath. XML Query Language ("XQuery") and XML Path Language ("XPath") are important standards for a query language, which can be used in conjunction with SQL to express a large variety of useful queries. XPath is described in *XML Path Language* (*XPath*), version 1.0 (W3C Recommendation 16 Nov. 1999), which is incorporated herein by reference.

One benefit of storing XML documents in a database system is that XML allows multiple applications to perform operations using the same XML documents. This requires that the XML data be general enough to be understood by all applications that share XML documents. However, in many cases, there is a need to include application specific information in the XML document. Application specific information is data contained within the XML document that is only used, needed, and/or recognized by less than all applications for which the XML document is being maintained or made accessible.

Including application specific information in a shared XML document poses a significant problem because multiple applications are using the same XML document and not all of the applications can identify, handle, and recognize the application specific information. For purposes of explanation consider the following XML document:

| Article1.xml |
|---|
| <Article xmlns= "http://www.mycompany.com" |
| Xmlns:fmt=http://www.mycompany.com/format"> |
|   <fmt:justified> |
|     <Date> January 01, 2001 </Date> |
|     <Title> My title </Title> |
|     <Author> John <fmt:italic> Jonathan </fmt:italic> Doe </Author> |
|     <Text> |
|       ............... <fmt:bold> This is Important |
|       </fmt:bold> ...... |
|     </Text> |
|   </fmt:justified> |
| </Article> |

Consider two applications that share the XML document Article1.xml. Application 1 is responsible for displaying the article content and Application 2 is a tool for searching the article content. Application 1 inserted the following formatting information into Article1.xml: <fmt:justified>, <fmt:italic>, and <fmt:bold>. The formatting information is useless to Application 2, which performs search queries on the Article content. When Application 2 requests to return all article titles for articles written by Jonathan, Application 2 may use in an XPath query a path expression like '/Articles/Title and/Articles/Author'. The formatting information inserted by Application 1 poses two significant problems for path expression evaluation.

The first problem is that the path expression leading to the Title and Author elements changes with the addition or deletion of formatting information. The second problem occurs when formatting information is introduced into the leaf nodes of the XML document. If formatting information is added into the leaf nodes, they no longer remain leaf nodes and hence, text-search on the value of that node changes. For, example in the above document, a search for articles where author name matches "John Jonathan Doe" will not return the above document due to the formatting information contained in the Author node.

In addition, the problems described above involving path expression also hinders the ability and benefit of creating an index on XML documents that contain application specific information.

Based on the foregoing, there is a clear need to develop approaches for isolating nodes within a shared collection of XML documents and perform path operations with the XML data as if those nodes are not present.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
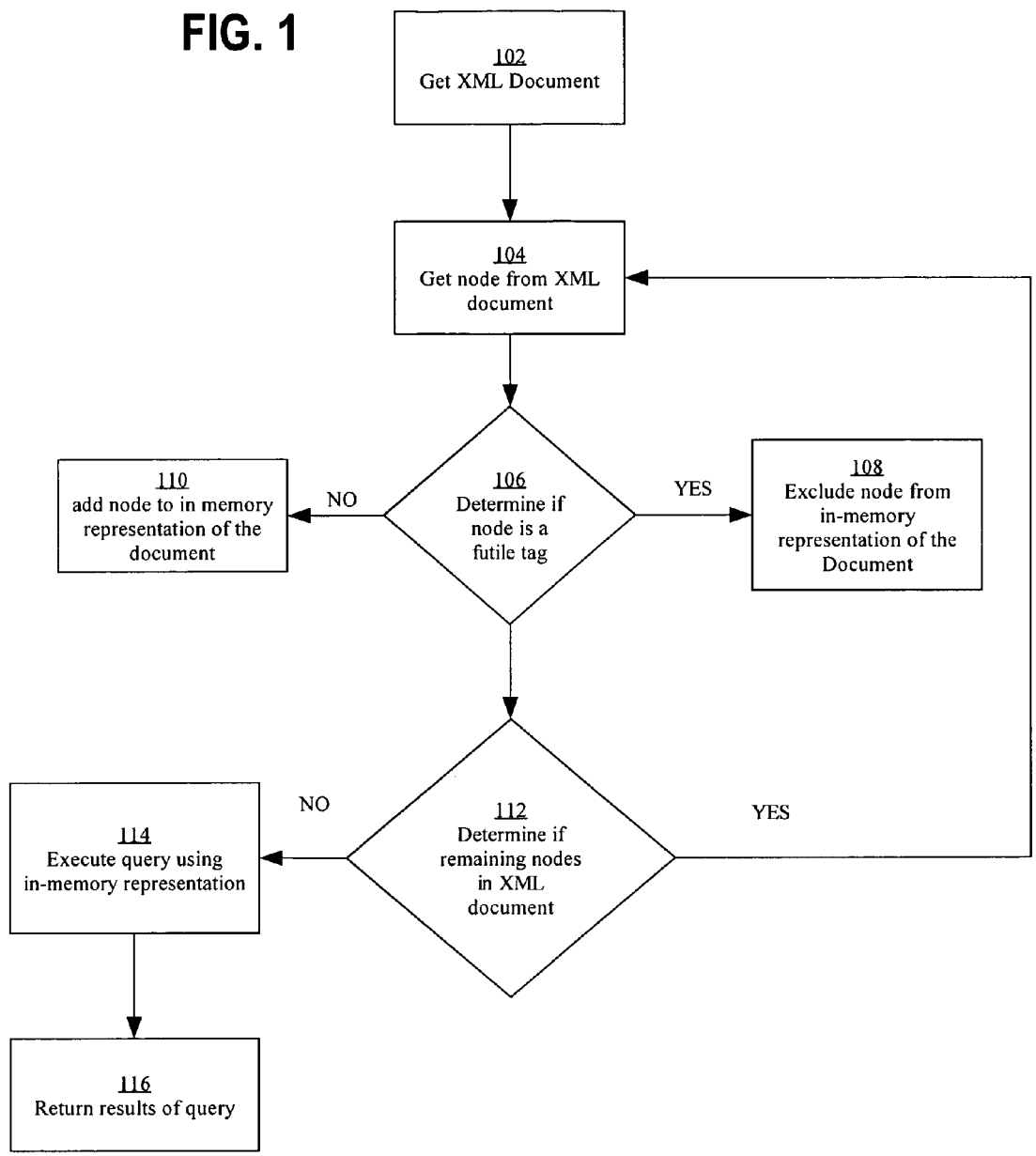
FIG. 1 is a flow diagram showing the steps taken during query evaluation that uses an in-memory representation of the XML document according to an embodiment of the present invention.

In the following description, for the purposes of explanation, numerous specific details are set forth in order to provide a thorough understanding of various embodiments of the invention. It will be apparent, however, that the present invention may be practiced without these specific details. In other instances, well-known structures and devices are shown in block diagram form in order to avoid unnecessarily obscuring the present invention.

Functional Overview

A mechanism is provided for detecting and disregarding specified nodes contained in shared XML documents. The mechanism may be used regardless of the format and data structures used to store the actual XML data (the "base structures"). For example, the actual XML data can reside in structures within or outside of a database, in any form, such as CLOB (character LOB storing the actual XML text), O-R (object-relational structured formed according to a schema, such as an XML schema), or BLOB (binary LOB storing some binary form of the XML).

The techniques described herein involve a mechanism for specifying and determining one or more nodes within XML documents to ignore and performing operations on the XML documents as if the nodes are not present. In one embodiment, a mechanism is provided by which a user may specify the criterion that determine which subset of nodes in XML documents are to be ignored from path expression evaluations.

Hierarchy Nature of XML Data

XML documents are represented as a hierarchy of nodes that reflects the XML documents hierarchical nature. The structure of an XML document establishes parent-child relationships between the nodes within the XML document. A hierarchy of nodes is composed of nodes at multiple levels. Each node at a level below the top level is a child node of one or more of the parent nodes at the level above. Nodes at the same level are siblings. A node that has no parent node linked to it is the root node, and a node that has no child nodes linked to it is a leaf node. The "path" for a node in an XML document reflects the series of parent-child links, starting from a "root" node, to arrive at the particular node.

For the purpose of explanation, consider the following XML document:

| Po1.xml |
|---|
| <PurchaseOrder><br>  <Reference>ABEL-20021127121040897PST</Reference><br>  <Actions><br>    <Action><br>      <User>ZLOTKEY</User><br>    </Action> |

| Po1.xml |
|---|
|     <Action><br>      <User>KING</User><br>    </Action><br>  </Actions><br>  ....<br></PurchaseOrder> |

The path to the "User" node in po1.xml is /PurchaseOrder/Actions/Action/User, since the "User" node is a child of the "Action" node, the "Action" node is a child of the "Actions" node, and the "Actions" node is a child of the "PurchaseOrder" node. PurchaseOrder is the root node.

Example XML Document

For the purpose of explanation, examples shall be given hereafter with reference to the following XML document:

| Article1.xml |
|---|
| <Article xmlns= "http://www.mycompany.com"<br>Xmlns:fmt=http://www.mycompany.com/format"><br>  <fmt:justified><br>    <Date> January 01, 2001 </Date><br>    <Title> My title </Title><br>    <Author> John <fmt:italic> Jonathan </fmt:italic> Doe </Author><br>    <Text><br>      .............. <fmt:bold> This is Important </fmt:bold> ......<br>    </Text><br>  </fmt:justified><br></Article> |

Isolating Nodes Within an XML Document

According to one embodiment, a mechanism is provided by which a user may specify criteria that specifies nodes of XML documents that are to be ignored during query evaluation. Specifically, a user may register criteria in the form of XML tags that identify nodes of an XML document that are to be excluded from query evaluation.

In one embodiment of the invention, the techniques described herein are used to specify and determine nodes within an XML document that correspond to Application specific information. By isolating the nodes corresponding to the application specific information, applications that do not use or recognize the application specific information can ignore and handle the XML documents as if those nodes are not present.

According to one embodiment, an initial registration of the nodes to ignore can be specified at the time a query is submitted. Alternatively, the nodes to ignore can be specified beforehand for an entire application. The user specifies the excluded nodes by identifying which tags of the XML document are "futile" to a particular query (hereinafter referred to as futile-tags). The one or more futile-tags are used to exclude fragments of XML documents that are known to be useless from a query standpoint.

For example, in Article1.xml the tag </fmt:italic> provides document formatting information. The formatting tag may only be useful to an application that displays the document content. For an application that runs a search on Article1.xml to return all article titles for articles written by Jonathan the formatting tags are useless and hinder the evaluation of the XPath query /Articles/Title and /Articles/Author.

By ignoring specified nodes from XML documents, multiple applications can use the same XML document and perform XPath expression evaluation even when the XML document contains portions of information only applicable to another application. Accordingly, in the above example, both the formatting application and the searching application can use the same XML document Article1.xml without the problems imposed by the formatting information.

According to one embodiment, futile-tags are specified based on a namespace. For example, in Article1.xml the tag </fmt:justified> has a namespace "fmt" indicating it is a formatting namespace. The user may specify that all tags in that namespace are considered futile and should be ignored when performing a query.

For example, in the XML document Article1.xml, assume that Application 1 has inserted the various formatting tags <fmt:justified>, <fmt:italic>, and <fmt:bold> throughout the XML document. If the formatting tags are useless to Application 2 the user can indicate that for Application 2 that "fmt" tag namespace tags are futile-tag for query evaluation.

In addition to using namespaces to indicate futile-tags, a user may also specify specific tags corresponding to nodes of the XML document that are to be excluded from query evaluation.

In yet another embodiment, query evaluation supports the building of indexes on XML data. When indexes are built and used for query evaluation, a registration of the nodes to ignore is specified at the time of index creation. The indexes will be built excluding the nodes to ignore as indicated by the futile-tags; no nodes corresponding to a futile-tag are added to the indexes Ignoring Node During XPath Query Evaluation In one embodiment, an application query that has one or more futile-tags indicated performs the query evaluation as if those tags were never present in the XML documents. Specifically, a query engine will ignore the nodes within the XML document indicated by the futile-tags when evaluating the query.

In one embodiment, the query engine constructs an in-memory representation of the XML document before processing the query. When the in-memory representation is constructed, the XML document is parsed and each node indicated by a futile tag is excluded from the in-memory representation of the XML document. Upon completion of the in-memory representation, the query is evaluated based on the in-memory representation, thereby evaluating the query as if the excluded nodes were never in the original XML document.

FIG. 1 illustrates the steps taken when evaluating a query, which employs an in-memory representation. In step 102, the XML document is retrieved. In step 104, the XML document from step 102 is parsed and a node is extracted from the XML document. Once the node is extracted, the node is compared to the user specified futile-tags to determine if there is a match in step 106. If there is a match between the node and one of the futile-tags, the node is excluded from the in-memory representation in step 108. However, if the node does not match any of the futile-tags, then the node is added to the in-memory representation of the XML document in step 110. In step 112, a determination is made as to whether there are remaining nodes in the XML document to be parsed. If there are remaining nodes, then steps, 104-112 are repeated until the entire XML document has been parsed. In step 114, once the XML document has been parsed and an in-memory representation completed, the query can be executed. Finally, in step 116, the results of the query are returned to the application.

In another embodiment of the invention, the query engine performs streaming-XPath query evaluation. Streaming XPath evaluation performs the query evaluation based directly on the original XML document. No index or in-memory representation of the XML document is used in streaming XPath evaluation. When streaming XPath evaluation is used, the query engine itself will determine and exclude nodes based on the specified futile-tags during the XPath evaluation.

In yet another embodiment of the invention, the query engine employs indexes on XML documents to perform the query evaluation. When the query engine uses an index, it is preferable that the futile tags are specified at the time of index creation. Providing the futile tags at the time of index creation allows any futile tags within current and future XML documents to be ignored at the time they are inserted into the index. When the query engine evaluates the query using the indexes the excluded nodes, will not appear in the indexes and thus, the query is executed as if the excluded nodes where never in the original XML document.

Figure 2:
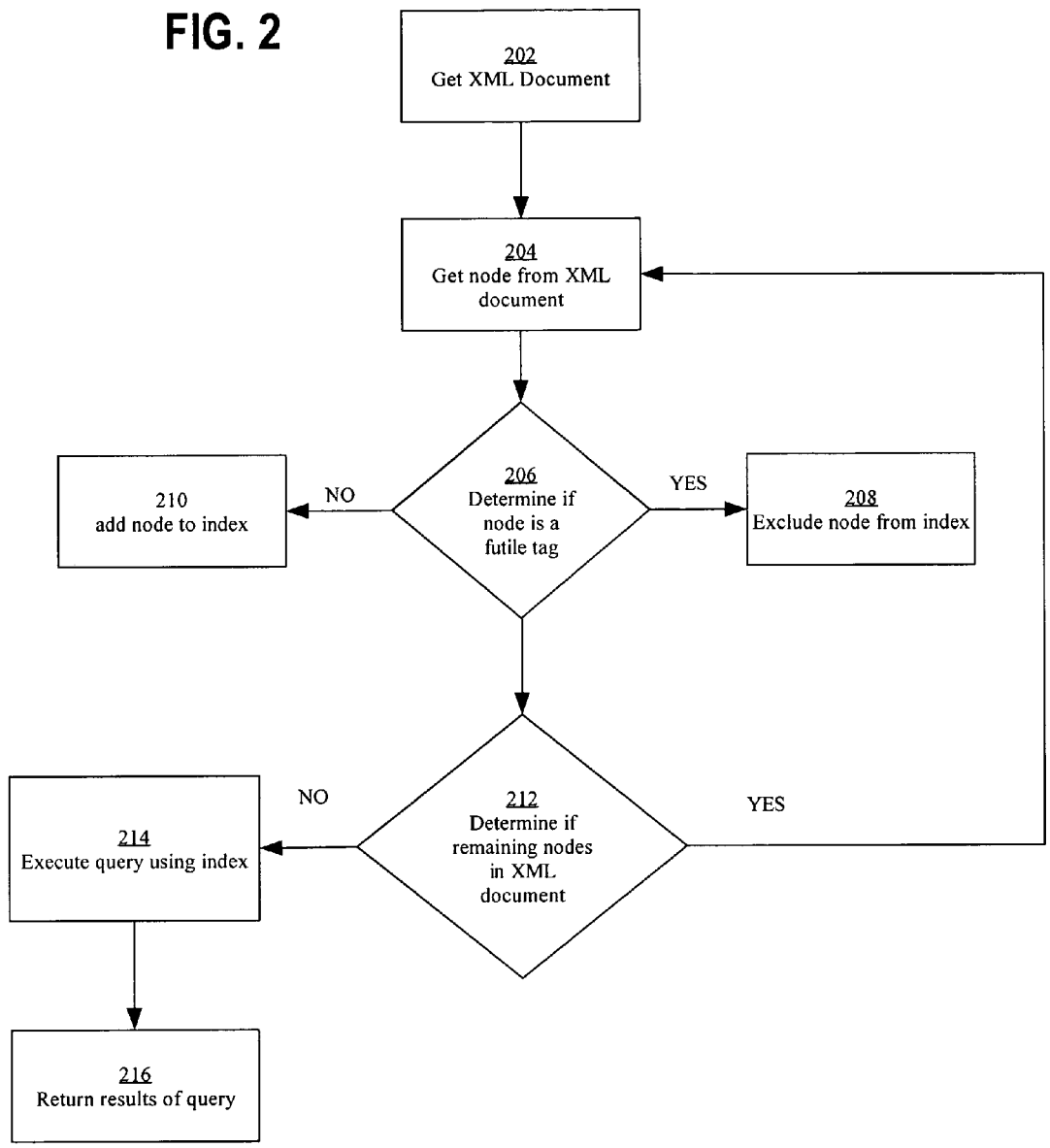
FIG. 2 is a flow diagram showing the step taken during query evaluation that uses indexes of XML document according to an embodiment of the present invention.

In FIG. 2, the steps taken to evaluate a query which employs indexes on the XML documents is shown. The steps are very similar to those with respect to FIG. 1 except that the nodes are added or excluded from the indexes instead of the in-memory representation of the XML document. In step 202, the XML document is retrieved. In step 104, the XML document from step 202 is parsed and a node is extracted from the XML document. Once the node is extracted, in step 206, the node is compared to the user specified futile tags to determine if there is a match. If there is a match between the node and one of the futile tags, the node is excluded from the indexes in step 208. However, if the node does not match any of the futile tags, then the node is added to the indexes in step 210. In step 212, a determination is made as to whether there are remaining nodes in the XML document to be parsed. If there are remaining nodes, then steps 204-212 repeat until the entire XML document has been parsed. Once the index is complete, queries can be executed 214 using the index and returned to the application 216.

Creating an XML index and using the XML index to answer XPath queries is described in U.S. patent application Ser. No. 10/884,311, entitled XML INDEX FOR ACCESSING XML DATA, filed on Jul. 2, 2004 which is incorporated herein by reference.

Hardware Overview

Figure 3:
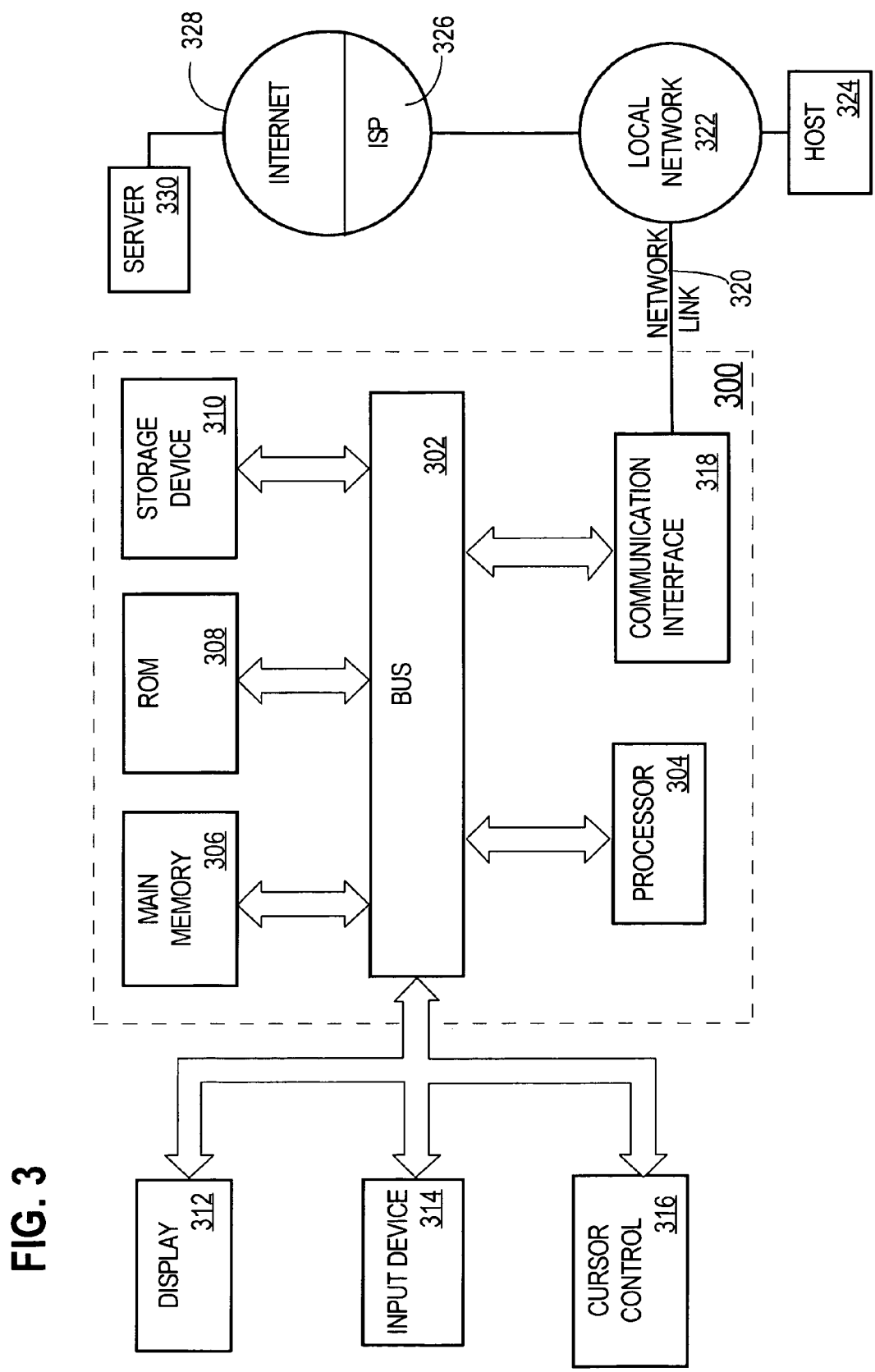
FIG. 3 is a block diagram of a computer system that may used to implement an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire, and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the"Internet" 328. Local network 322 and Internet 328 both use electrical, electromagnetic, or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320, and communication interface 318. In the Internet example, a server 330 might transmit a requested code for an application program through Internet 328, ISP 326, local network 322, and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A method for isolating application specific information in XML data, the method comprising the steps of:
   receiving one or more criteria that identifies nodes within a collection of XML documents to ignore;
   receiving a query that specifies a path operation based on a path;
   wherein one or more of said identified nodes is under said path; and
   based at least on the one or more criteria, computing the path operation as if one or more of said identified nodes is not in the collection of XML documents;

wherein the method is performed by one or more computing devices.

2. The method of claim 1, further comprising the step of generating a representation of the collection of XML documents wherein the representation does not contain the nodes identified by the one or more criteria.

3. The method of claim 2, wherein the step of generating a representation of the collection of XML documents comprises the steps of:
parsing the collection of XML documents; and
excluding one or more nodes within the collection of XML documents from the representation wherein the one or more nodes within the collection of XML documents is identified by the one or more criteria.

4. The method of claim 1, further comprising the step of generating an index of the collection of XML documents, wherein the index does not contain one or more nodes identified by the one or more criteria.

5. The method as recited in claim 4, wherein the one or more criteria is based on criteria identifying one or more tags within the collection of XML documents.

6. The method of claim 4, wherein the one or more criteria is based on criteria identifying a namespace within the collection of XML documents.

7. The method of claim 1, wherein the one or more criteria that identifies nodes within a collection of XML documents to ignore is based on a namespace.

8. The method of claim 1, wherein the collection of XML documents is maintained by a database system.

9. The method of claim 1, wherein the collection of XML documents includes documents stored in at least one of a BLOB, CLOB, or object-relational structure.

10. A method for isolating application specific information using shared XML data, the method comprising the steps of:
receiving, for a first application, one or more criteria that identifies nodes within a collection of XML documents to ignore;
receiving, from the first application, a query that specifies a path operation based on a path;
wherein one or more of said identified nodes is under said path;
based at least on the one or more criteria, computing the path operation as if one or more of said identified nodes is not in the collection of XML documents;
receiving, from a second application, one or more operations to perform on the collection of XML documents; and
processing the one or more operations without ignoring the nodes identified by one or more criteria;
wherein the method is performed by one or more computing devices.

11. A non-transitory computer-readable medium storing one or more sequences of instructions which, when executed by one or more processors, causes the one or more processors to isolate application specific information in XML data at least in part by causing:
receiving one or more criteria that identifies nodes within a collection of XML documents to ignore;
receiving a query that specifies a path operation based on a path;
wherein one or more of said identified nodes is under said path; and
based at least on the one or more criteria, computing the path operation as if one or more of said identified nodes is not in the collection of XML documents.

12. The non-transitory computer-readable medium of claim 11, wherein the one or more sequences of instructions, when executed, further cause generating a representation of the collection of XML documents wherein the representation does not contain the nodes identified by the one or more criteria.

13. The non-transitory computer-readable medium of claim 12, wherein the one or more sequences of instructions, when executed, cause generating a representation of the collection of XML documents at least in part by:
parsing the collection of XML documents; and
excluding one or more nodes within the collection of XML documents from the representation wherein the one or more nodes within the collection of XML documents is identified by the one or more criteria.

14. The non-transitory computer-readable medium of claim 11, wherein the one or more sequences of instructions, when executed, further cause generating an index of the collection of XML documents, wherein the index does not contain one or more nodes identified by the one or more criteria.

15. The non-transitory computer-readable medium of claim 14, wherein the one or more criteria is based on criteria identifying one or more tags within the collection of XML documents.

16. The non-transitory computer-readable medium of claim 14, wherein the one or more criteria is based on criteria identifying a namespace within the collection of XML documents.

17. The non-transitory computer-readable medium of claim 11, wherein the one or more criteria that identifies nodes within a collection of XML documents to ignore is based on a namespace.

18. The non-transitory computer-readable medium of claim 11, wherein the collection of XML documents is maintained by a database system.

19. The non-transitory computer-readable medium of claim 11, wherein the collection of XML documents includes documents stored in at least one of a BLOB, CLOB, or object-relational structure.

20. A non-transitory computer-readable medium storing one or more sequences of instructions which, when executed by one or more processors, causes the one or more processors to isolate application specific information using shared XML data at least in part by causing:
receiving, for a first application, one or more criteria that identifies nodes within a collection of XML documents to ignore;
receiving, from the first application, a query that specifies a path operation based on a path;
wherein one or more of said identified nodes is under said path;
based at least on the one or more criteria, computing the path operation as if one or more of said identified nodes is not in the collection of XML documents;
receiving, from a second application, one or more operations to perform on the collection of XML documents; and
processing the one or more operations without ignoring the nodes identified by one or more criteria.

* * * * *